United States Patent [19]

Estes

[11] Patent Number: 4,836,295
[45] Date of Patent: Jun. 6, 1989

[54] BASEBALL INFIELD CONDITIONING APPARATUS

[76] Inventor: Rodger E. Estes, 4115 Southernaire Dr., Lemay, Mo. 63125

[21] Appl. No.: 128,702

[22] Filed: Dec. 4, 1987

[51] Int. Cl.⁴ .................. A01B 27/00; A01B 29/04; A01B 31/00; A01B 49/02
[52] U.S. Cl. .................. 172/146; 172/151; 172/170; 172/197; 172/612; 172/200; 172/150
[58] Field of Search .............. 172/150, 151, 149, 170, 172/197, 199, 200, 554, 172, 173, 684.5, 612, 189, 502; 404/128, 124, 127

[56] References Cited

U.S. PATENT DOCUMENTS

| | | | |
|---|---|---|---|
| 214,802 | 4/1879 | Albaugh | 172/173 X |
| 620,034 | 2/1899 | Hedges | 172/150 |
| 654,353 | 7/1900 | Oldham | 172/150 |
| 767,890 | 8/1904 | Hoyle | 172/554 |
| 1,445,506 | 2/1923 | Gorhy | 172/684.5 |
| 1,473,405 | 11/1923 | Goodell | 172/150 X |
| 1,530,329 | 3/1925 | Roberts | 172/684.5 |
| 1,569,421 | 1/1926 | Coelho | 172/612 |
| 1,829,745 | 11/1931 | Grossi | 172/612 X |
| 2,870,554 | 1/1959 | Marvin | 172/150 |
| 3,225,835 | 12/1965 | Steinbach . | |
| 3,225,839 | 12/1965 | Petitt . | |
| 3,448,814 | 6/1969 | Bentley | 172/197 |
| 3,463,240 | 8/1969 | Mascaro | 172/189 |
| 3,621,921 | 11/1971 | Wachunas | 172/197 |
| 3,861,475 | 1/1975 | Kuncewicz | 172/71 |
| 3,915,239 | 10/1975 | Hendrichon | 172/146 |
| 3,989,404 | 11/1976 | Burton | 404/128 |
| 4,337,586 | 7/1982 | Buono | 172/149 |
| 4,374,546 | 2/1983 | Mitchell | 172/148 |
| 4,437,245 | 3/1984 | Nigmela . | |

FOREIGN PATENT DOCUMENTS

| | | | |
|---|---|---|---|
| 446508 | 4/1936 | United Kingdom | 172/684.5 |
| 640312 | 7/1950 | United Kingdom | 172/684.5 |

Primary Examiner—Richard J. Johnson
Attorney, Agent, or Firm—Polster, Polster and Lucchesi

[57] ABSTRACT

An apparatus for leveling and conditioning baseball infields and the like includes a scarifier, pulverizer, drag, and roller, all mounted on a common frame. The frame and at least some of the implements may be adjusted to adjust or disable the scarifier, pulverizer, and drag individually. The apparatus may be pulled by a small garden tractor.

13 Claims, 2 Drawing Sheets

BASEBALL INFIELD CONDITIONING APPARATUS

BACKGROUND OF THE INVENTION

This invention relates to a device for tending baseball diamond dirt infields. The term baseball is used herein to include softball. It will be understood that the device may also be used for tending other dirt playing fields which must be kept smooth and level.

In caring for a baseball diamond, generally, the dirt of the infield is broken up, leveled and smoothed at the beginning of the baseball season. Because the field is used for play, it must also be frequently leveled and smoothed throughout the season. Presently, at the beginning of the season the infield dirt is broken up using a tractor-pulled disc or harrow. Thereafter, and throughout the season, the dirt is usually leveled and smoothed by pulling a drag across the field. Typically, the drag is a section of chain link fence with railroad ties, or other long heavy objects, placed transversely across it to act as a screen, over the field.

The procedure presently used requires at least two pieces of equipment, a harrow and a drag, and at least two operations, harrowing the field and dragging the field. This procedure does not always give sufficient results. The harrowing operation creates large clumps of earth which the chain link fence and screen frequently cannot adequately break down in a single pass, especially when the ground is wet. Therefore the clumps of earth and ruts formed by the harrowing operation may remain. Further, since most disc harrows require a three-point hitch, a large, heavy, expensive tractor is needed. When this tractor is pulling the drag and the screen across the field, the tractor may leave ruts which may not be fully filled or removed by the leveling operation. When the drag is used alone, it may not adequately level and smooth the field, especially when the field is too wet or dry. For example, the drag may need to be pulled across the field several ties, it may leave ruts in the field, or it may leave large clods of dirt.

Previous inventors have provided devices for the conditioning of gardens, fields, tracks, and ski trails. See Steinbach U.S. Pat. No. 3,225,835, Petitt U.S. Pat. No. 3,225,839, Kuncewicz U.S. Pat. No. 3,861,475, Hendrichon U.S. Pat. No. 3,915,239, Mitchell U.S. Pat. No. 4,374,546, and Nigmela U.S. Pat. No. 4,437,245. These devices are not designed to condition a flat playing field, and many are complex or require heavy equipment to pull them.

SUMMARY OF THE INVENTION

One object of this invention is to provide a device that will both break up and pulverize the dirt of a baseball infield, such that large clumps of earth will not remain after the operation.

It is another object of this invention to provide such a device that will level and sift the dirt.

It is another object of this invention to provide such a device that will compact the dirt so that a smooth, level surface will result.

Another object of this invention is to provide such a device in which all the implements attached thereto perform a leveling function.

Another object of this invention is to provide such a device which may be pulled by a light, inexpensive, garden tractor.

Another object of this invention is to provide a device which permits easy selection of the implements in use, to accommodate different conditions and compositions of the field.

Another object is to provide such a device which permits easy adjustment of the height of the device to accommodate different conditions and composition of the field.

These and other objects will become apparent to those skilled in the art in light of the following description and accompanying drawings.

In accordance with one aspect of this invention, generally stated, a device is provided which may be pulled behind a small tractor, to which it is coupled by a single hitch; the device comprising a frame with a ground breaking means attached thereto, a drag suspended therefrom, and a roller rotatively attached at the rear thereof.

Preferably, the ground breaking means comprises a scarifying means and a pulverizing means. This combination of implements provides a means whereby an infield will be broken such that the large clumps of earth that are formed by the scarifying means are not left as large clumps but are broken down into smaller clumps which are easier to level and roll.

The scarifier, or other ground breaking means, is positioned at the front of the frame to initially break up the ground into large clumps. The novel scarifier of the preferred embodiment is a drop gate scarifier which is pivotally attached to the frame of the apparatus so as to allow the operator to disengage the scarifier from the ground. When it is not desired to be used, the scarifier may be raised and held out of position.

The pulverizer, composed of a spiked roller, is positioned behind the scarifier to break up and pulverize the clumps of earth dug up by the scarifier. The tines or spikes of the preferred pulverizer are socketed and are therefore removable. They screw in and can easily be removed and replaced when they are worn out or broken.

The drag is used to level out and sift pulverized clumps of earth. The preferred drag is made from a section of an expanded metal sheet, but may be made from any rigid, heavy, perforate sheet which will remain generally level when raised above the ground. The drag is suspended by chains or other hanging means such that it may easily be raised above the ground. The preferred hanging means also provides some slack when the drag is on the ground so that the drag will lie flat on the ground, held there by its weight, and will not lift up when contacting a rise in the ground. The drag serves three functions. It levels the ground beneath it; it further breaks up the pulverized ground; and it sifts the pulverized ground. As the drag is pulled across the ground, its perforations will successively cut down any raised ground, thereby leveling the earth beneath it. As the dirt is lifted onto the drag, either over the front edge, or through the perforations, the clumps tumble around on the upper surface of the drag and are further broken down or crumbled as they collide with each other. As the drag passes over a depression in the ground, the smaller particles of dirt fall through the perforations in the drag, filling ruts formed by the tractor itself or by the scarifying or pulverizing means, thereby sifting the pulverized dirt and further leveling the field.

The roller is attached to the rear of the frame to compress the earth so that a smooth flat surface results from the operation. A scraper is attached to the frame immediately in front of the roller. The scraper extends diagonally upward and rearward until it contacts the roller to remove dirt from the roller. The dirt will slide down the scraper and fall onto the drag to be sifted along with the rest of the dirt on the drag.

Preferably, the frame has connected to it coupling means such that the device may be connected to a garden tractor. A simple coupling means, such as a hinged tongue, which is compatible with a garden tractor's single hitch, as opposed to a three-point hitch which is generally only compatible with the hitch on a large tractor, is preferred.

In accordance with another aspect of this invention, generally stated, a device is provided comprising a frame which pivots about its rear axle, a roller on the rear axle, elevating means such that the front of the frame may be raised with respect to the rear of the frame, and two or more implements in front of the roller which may be raised independently of one another. By raising the front of the frame, the operator may, in almost any combination, disengage one or more implements forward of the roller. In the preferred embodiment, the height of the front of the frame is adjusted by adjusting the position relative to the frame of a ground-engaging tricycle wheel or caster. Preferably, the drag is hung from the frame by hanging means such that the drag may be raised and lowered independently of any other implements. Likewise, the scarifier, which is a drop gate scarifier, may also be raised independently of any other implement. The ability to raise and lower the frame also allows the operator to accurately control the depth to which the scarifier and pulverizer dig into the ground. When the scarifier is raised, the depth of the pulverizer is likewise determined by adjusting the height of the forward wheel. Here it is important that the coupling means described above is a hinged tongue. In using a hinged tongue, the height of the front of the frame will have no bearing on the height of the tractor's hitch. This not only allows better control of the depth to which the ground breaking means dig, but also allows of transferability between different tractors.

In accordance with another aspect of this invention, a device is provided which comprises a frame and one or more implements attached thereto which all comprise an unbroken portion which extend the entire width of the implement and which perform a leveling function. Here, each implement's leveling capability is finer than the previous implement's leveling capability. The preferred scarifier levels as it is used. The scarifier's tines dig up the ground, and the loose dirt builds up in front of the scarifier. As dirt is pushed forward, only the dirt that can pass under the scarifier is allowed through, thereby leveling the dirt very roughly. The body of the scarifier will also cut down rises in the ground it encounters thereby performing another leveling function. The pulverizer also levels. As described previously, the preferred pulverizer is a spiked roller. As the roller pulverizes the clumps left by the scarifier, it also compresses them as it passes over them, thereby leveling the dirt. This is still a rough leveling operation, but it is not as rough as that of the scarifier. The drag levels as previously described, by cutting down rises in the ground it encounters and by filling depressions in the ground with the dirt riding on its upper surface. This leveling operation is now finer and many of the ruts are filled and the bumps in the ground are cut down. The roller performs the final and finest leveling function, leaving a smooth flat surface.

DESCRIPTION OF THE PREFERRED EMBODIMENT

Figure 1:
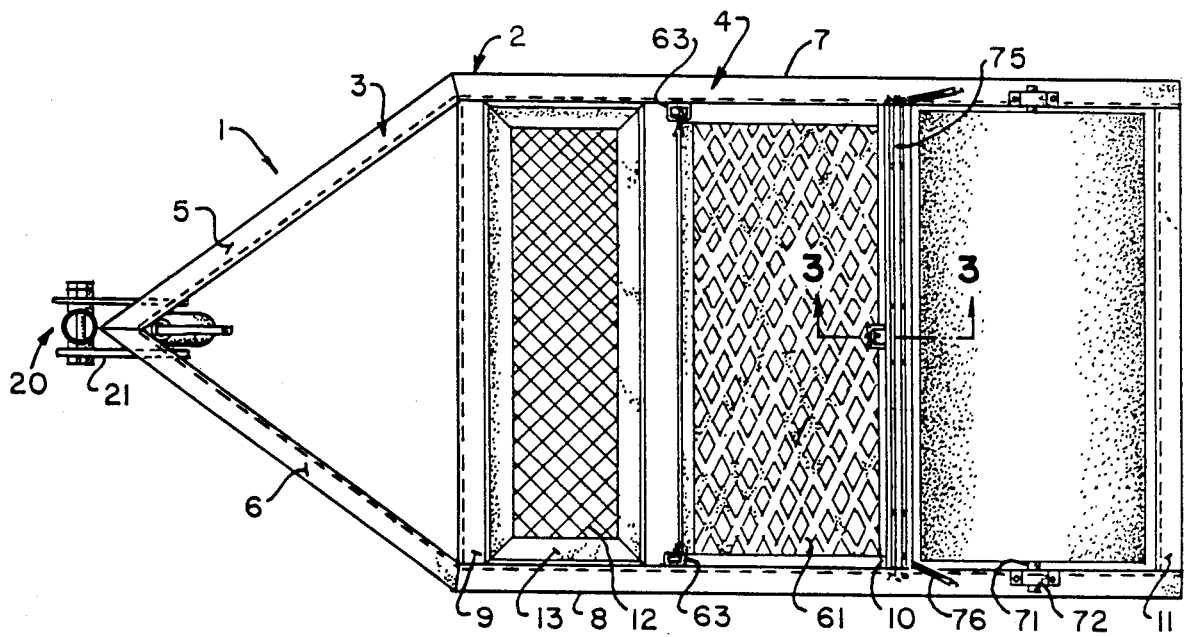
FIG. 1 is a top plan view of one embodiment of ground conditioning apparatus of the present invention.
Figure 2:
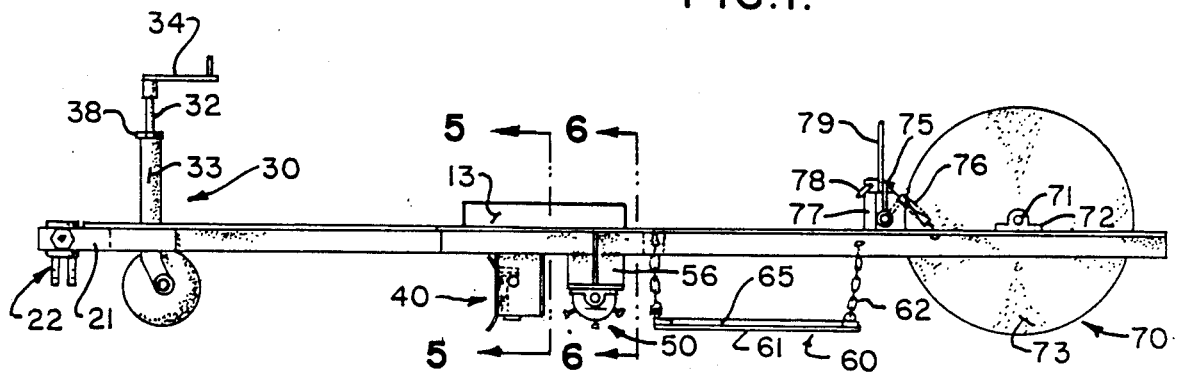
FIG. 2 is a view in side elevation thereof.

Referring now to the drawings and in particular to FIGS. 1 and 2, the preferred embodiment of ground conditioning apparatus 1 includes a frame 2, seven feet in length and four feet in width, made from steel L-beams on which implements are mounted. The frame 2 includes a triangular yoke 3 at the front, and a rectangular section 4 at the rear. The yoke 3 comprises two beams 5 and 6, equal in length, which are attached to the rectangular portion 4 and which are attached to each other at a point in front of the middle of the rectangular section. The rectangular section comprises two side bars 7 and 8, one forward cross bar 9, to which the yoke bars 5 and 6 are attached, one middle cross bar 10, and one rearward crossbar 11. A section of expanded metal 12, in a rectangular frame 13 of angle irons, covers the area behind the forward crossbar 9 to serve as a place to put ballast when extra weight is needed and as a protective covering. All beams and bars comprising the frame 2 lie substantially in the same horizontal plane.

Figure 8:
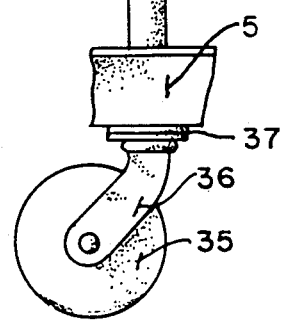
FIG. 8 is a detail in side elevation, partially broken away, of an elevating means for the frame of the ground conditioning apparatus of FIGS. 1 and 2.
Figure 10:
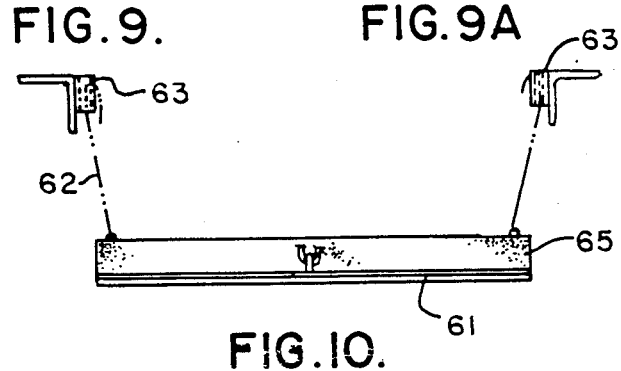
FIG. 10 is a somewhat diagrammatic view, corresponding to FIGS. 5 and 6, of a drag hanging from the frame of the ground conditioning apparatus of FIGS. 1 and 2.

At the front of the triangular yoke 3 is a coupling means 20, and a frame elevating means 30 as shown in more detail in FIG. 8. The rectangular section 3 of the frame carries scarifying means 40, pulverizing means 50, drag means 60, and rolling means 70.

The coupling means 20 is a simple hitch, in the form of a hinged tongue 22 of the type conventionally used with garden tractors, instead of a three-point hitch, so that the apparatus may be pulled by a sixteen to twenty horsepower garden tractor instead of a large tractor which is required by three-point hitches. The tongue 22, is pivotally attached to a forward rectangular frame 21 which is welded to the yoke 3. The tongue 22 pivots around a horizontal axis so that the apparatus may be transferred between tractors.

The frame elevating means 30 comprises a hollow tube 33 which is welded to the inside of the apex at the front of the yoke 3. The hollow tube 33 is capped with a threaded nut 38 through which a crankshaft 32, which has a crank 34 mounted on top, is threaded. The crankshaft 32 extends the length of the hollow tube 33 and has mounted at its bottom a plate 37. A supporting frame 36 is rotatively mounted to the underside of the plate 37 such that the frame 36 rotates about a vertical axis. Finally an eight inch pneumatic caster 35 is rotatively mounted to the supporting frame 36.

Figure 5:
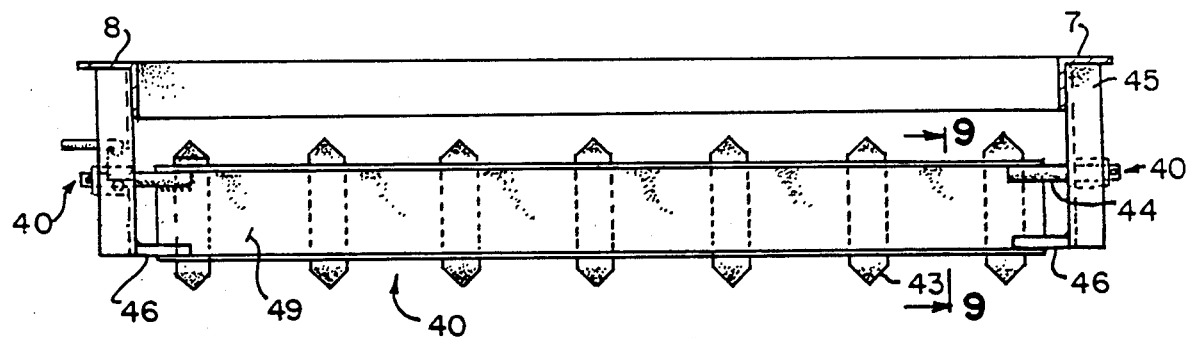
FIG. 5 is a sectional view, taken along the line 5—5 of FIG. 2, of a scarifier portion of the ground conditioning apparatus of FIGS. 1 and 2.
Figure 9:
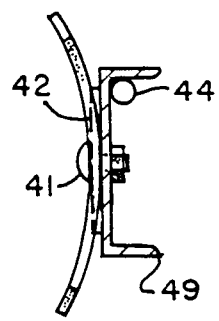
FIG. 9 is a sectional view taken along the line 9—9 of FIG. 5 of the drop gate scarifier portion of the ground conditioning apparatus of FIGS. 1 and 2.
Figure 9A:
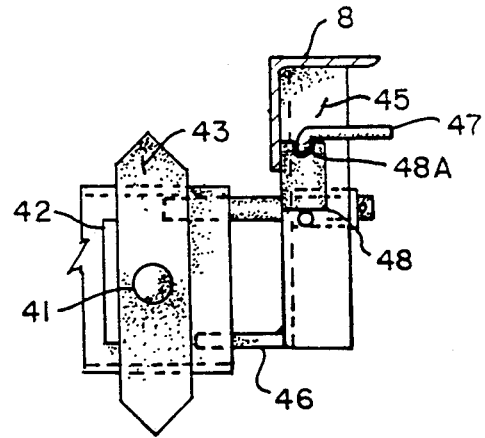
FIG. 9A is a detail showing a holding mechanism for the drop-gate scarifier portion of the ground conditioning apparatus of FIGS. 1 and 2.

As shown in FIG. 2, the scarifier 40 is placed at the front of the rectangular section 4 just behind the forward crossbar 9 and under the forward area of the protective covering 12. As shown in FIG. 5, the scarifier 40 extends the full width of the frame 2. The scarifier 40 has seven evenly spaced tines 43, made from two inch by seven inch curved cultivator shoes as may be obtained from the John Deere Co. The tines 43 are each bolted to an elongate rectangular body 49 made of a heavy U-channel using a single one-inch by seven-sixteenths inch plow nut 41. Next to each tine is a guide bar 42 to prevent the tine from rotating about its bolt 41. The scarifier body 49 is welded to an axle 44 which is pivotally carried by downwardly extending flanges 45 which are mounted on the underside of the side bars 7 and 8. The flanges 45 each have welded to them a horizontal plate 46 which extends inward toward the center of the frame 2 to prevent the scarifier 40 from swinging back too far. The scarifier 40 may be raised and held in position using a Z-shaped steel rod 47. As shown in FIG. 9A, the rod 47 is rotatably carried in a sleeve 48 welded to the flange 45 on the side bar 8. When the scarifier 40 is rotated to its raised position, the upper portion of the rod 47 is grasped and rotated to a position parallel to side bar 8, so that the lower portion of the rod 47 engages the body 49 of the scarifier 40. In this locked position, the upper portion of the rod 47 is trapped in a slot 8A in the sleeve 48.

Figure 4:
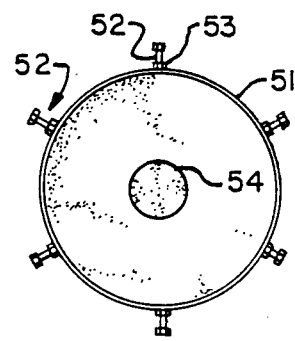
FIG. 4 is a cross-sectional view of a pulverizer portion of the ground conditioning apparatus of FIGS. 1 and 2.
Figure 6:
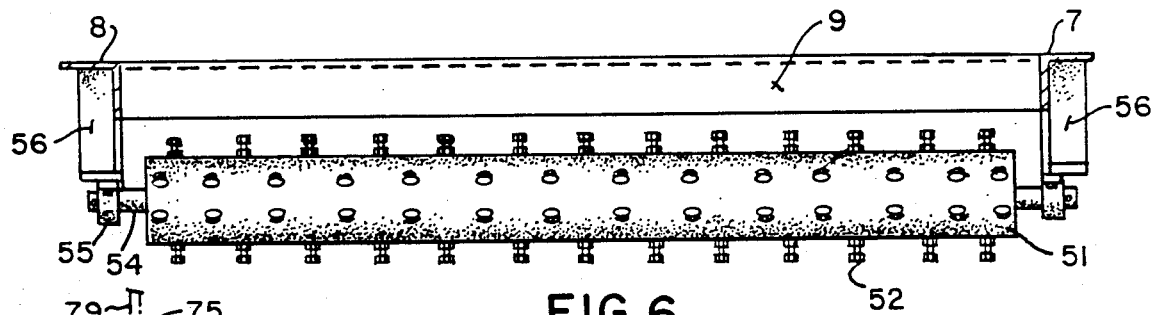
FIG. 6 is a sectional view, taken along the line 6—6 of FIG. 2, of a pulverizer portion of the ground conditioning apparatus of FIGS. 1 and 2.
Figure 7:
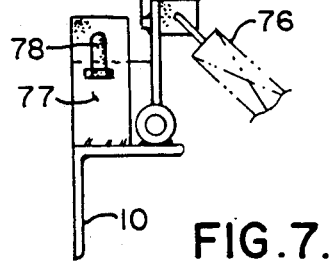
FIG. 7 is a detail view in side elevation of a roller scraping bar of the ground conditioning apparatus of FIGS. 1 and 2.

As shown in FIG. 2, the pulverizer 50 is attached to the frame behind the scarifier. As shown in FIGS. 4 and 6, it comprises a roller 51, four inches in diameter, which extends the full width of the frame and tines 52 attached to the roller 51. The tines 52 of the pulverizer are made from $\frac{3}{4}$". Allen screws arranged in six rows of fifteen screws each. The screws are separated by three inches and the rows are staggered 1.5 inches apart. The pulverizer's tines 52 screw into $\frac{3}{8}$" sixteen thread nuts 53 which are welded to the roller 51 so that they may be individually removed when worn out or broken. The pulverizer 50 rotates about an axle 54 which is carried by downwardly extending journals 55. The journals 55 are in turn secured to downwardly extending plates 56 which are secured to the underside of the side bars 7 and 8.

Figure 3:
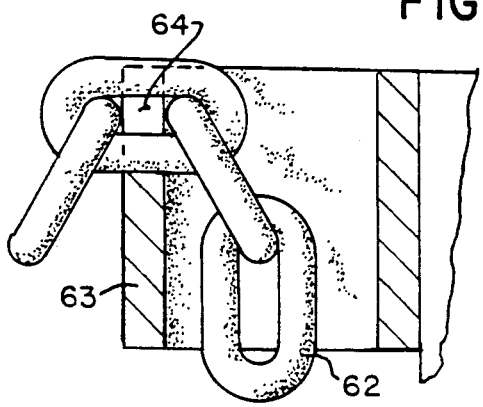
FIG. 3 is a sectional view, taken along the line 3—3 of FIG. 1, of a bracket holding a height adjustment chain for a drag portion of the ground conditioning apparatus of FIGS. 1 and 2.

The drag 60 is preferably a heavy expanded steel sheet 61, two feet in length and extending the full width of the frame, suspended from the frame by three chains 62 one at each front corner of the drag and another at the middle rear. The sheet 61 is welded to a frame 65 formed of angle iron. The chains 62 fit through slots 64 of brackets 63, comprised of a slotted tube (as shown in FIG. 3), to hold the drag 60 in a raised position. The brackets 63 are secured directly to the side bars 7 and 8 and the central crossbar 10. The chains are also the drag's elevating means. By pulling up on each chain, the drag will be raised. The brackets will hold the chains in place so that the drag will not drop.

At the rear of the frame 2, just behind the rear crossbar 11, is a roller assembly 70 comprised of a water-filled sixteen inch diameter roller 73 which extends the full width of the frame. The roller 73 rotates about an axle 71 carried by journals 72, secured to the side bars 7 and 8.

Immediately preceding the roller 70 is a scraper 75, which extends the full width of the frame. The lower edge of the scraper 75 is pivotally secured to the frame above the central crossbar 10 and extends diagonally upwards and rearwards into contact with the roller 70, such that dirt that is scraped from the roller 70 will slide down the scraper 75 and fall onto the drag 60. The scraper 75 is biased against the roller 70 by springs 76, as shown in broken lines in FIG. 2. When not needed, as when the field is dry, the scraper 75 may be pulled by handle 79 out of engagement with the roller 70 and held in such an open position by a post 77 attached to the side bar 8 and a pin 78, as shown in solid lines in FIG. 2.

When used, the ground conditioning apparatus 1 is connected to a tractor by means of the hinged tongue 22. Before the apparatus 1 is pulled to the playing field, all implements must be disengaged from the ground. Therefore, the frame 2 is raised by turning the crank 34 until the pulverizer 50 is raised off the ground. The scarifier 40 is raised and held in place by turning the rod 47 so that its lower end engages the scarifier body 49 and its upper end is held in the groove 48A of the sleeve 48. The drag 61 is raised off the ground by pulling up on its chains 62 and placing the chains in the slots 64 of the brackets 63. When pulling up the drag, the number of links beneath the brackets 63 should be equal so that the drag will stay level.

Once on the playing field, the desired implements may be selected. Although any number of the implements may be selected in almost any combination, for best results, all implements behind the first implement chosen should be used. Normally, when a baseball infield is first conditioned in the spring, all three forward implements are used. The scarifier 40 is lowered by lifting the rod 47 and turning it so that the lower end of the rod 47 lies parallel to the side bar 8, clear of the scarifier body 49. The pulverizer 50 is lowered to the ground by lowering the frame 2 using the elevating means 30. The depth to which the scarifier 40 and the pulverizer 50 dig into the ground can be accurately controlled using the crank 34 of the elevating means 30. Because the depth of cut of the scarifier and the pulverizer are fixed relative to each other, the device assures that the clods created by the scarifier are broken up by the pulverizer. The tines 43 of the scarifier 40 should not dig more than 1.5" into the ground, leaving at least 0.5" between the ground and the body 49 of the scarifier 40, so that the load on the tractor will not be too great. The drag 61 is lowered until it contacts the ground. When the drag 61 is lowered, the chains 62 should be a little slack. This assures that the weight of the drag 61 will keep it in contact with the ground. Maintaining an equal number of links of the chain 62 below each bracket assures that the drag will be level.

If the pulverizer 50 is the first implement to be used, the scarifier 40 is left in its upright position, and the frame 2 is lowered as before so that the pulverizer 50 engages the ground. The drag is also lowered as just described. In this configuration, the apparatus will quickly and effectively condition a moderately torn-up infield.

If only the drag is to be used, the frame is left in its raised position, and the drag is lowered. Because the front of the frame 2 is raised, the forward edge of the drag 61 is slightly higher than the rear. Therefore, the forward chains may be lowered a link or two further than the rear chain 63 to maintain the drag 61 level.

If the field only needs to be rolled, the apparatus is left as it is when it is pulled out to the field.

Once the implements are selected, the operator pulls the apparatus across the field using the tractor. When being pulled, the scarifier 40 digs into the ground, forming linear cuts in the direction of movement and breaking up its surface into clods to a depth of as much as two inches. The body 49 of the scarifier 40 travels close the the ground and tends to level the clods of earth, as well as leveling any major rises in the ground, as it passes over them. The tines 52 of the pulverizer 50 break up the clods, and its roller 51 levels the clods as it rolls over them. The drag 60 further breaks up, compacts, and levels the broken clods. As the rigid drag 61 rides over high spots, earth is cut off and carried on its upper surface. As it rides over low spots, the dirt is sifted through the drag to fill them. The roller 70 completes the job of leveling the infield, breaking up the ground to a fine consistency and packing it tightly. If any dirt clings to the roller 70 it may be removed by the scraper 75 and will tend to fall onto the drag 61, where it is sifted and spread.

Depending on the condition of the field, more than one pass around the field in parallel lines may be required to condition the field for play. It is best to avoid trying to level the pitcher's mound with the apparatus.

It will be seen that each of the implements, including the roller 70, includes a part which extends linearly across the path of the apparatus to perform a leveling function. Therefore, the infield is leveled to a greater degree than with previous known devices. It will also be seen that the scarifier tines 43, pulverizing tines 52, and the drag 61 are all easily replaced should they become bent, broken, or worn.

Numerous variations in the ground conditioning apparatus of this invention, within the scope of the appended claims, will occur to those skilled in the art in light of the foregoing disclosure. Merely by way of example, the apparatus may conveniently be made three feet wide and be pulled by a smaller, for example ten horsepower, garden tractor or riding mower. The apparatus may be made still wider, such as six feet wide, if a larger, for example farm size, tractor is available. A stationary clevis hitch is preferably used in the six foot model. Other coupling means may be used in conjunction with or instead of the tricycle wheel. The use of a hydraulically operated drawbar hitch permits easy raising of the apparatus for transport or when the edge of the dirt field is reached. The use of the tractor's hydraulic lift as the means for adjusting the height of the frame requires more skill than relying on the wheel 35, but is in some ways more convenient. Further, the forward hinged yoke 21 may be omitted, although this may result in a loss of maneuverability of the caster 35. Alternate elevating means may be used for the caster without losing any control over the depth to which the ground breaking means digs. The height of the scarifier or pulverizer may be adjusted independently with respect to the frame. The scarifier-pulverizer ground breaking means combination may be replaced by a single ground breaking implement, but this may result in a loss of the ground breaking ability which is inherent in the preferred device. Although the pivoted scarifier is preferred, a fixed scarifier may be used or a harrow may be used in place of the scarifier. Further the means for holding the pivoted scarifier in place may be altered. The drag may be made of other self-sustaining perforate material, such as a boiler grate. A section of chain-link fence is usable but is not preferred. The hanging means for raising and lowering the drag may also be altered. Other types of drags may be used. The roller 70 may be made a different diameter or of different materials. For example, a twelve-inch diameter, hollow, seamless steel pipe having steel end plates welded at the ends may advantageously be used. If the steel pipe is sufficiently thick, for example $\frac{3}{8}''$ or $\frac{1}{2}''$, the weight of the roller will be sufficient to provide excellent compaction. With a smaller diameter roller, the scraper 75 may be gravity-biased and the springs and locking mechanisms eliminated. Dimensions of all implements and the frame may also be changed without necessarily losing any advantages present in the preferred embodiment. These variations are merely illustrative.

I claim:

1. A device for conditioning of earth fields comprising:
   a. A frame having a forward end including hitch means and a rearward end;
   b. ground breaking means attached to the forward end of said frame for breaking the surface of the field;
   c. ground engaging means including elevating means associated with the forward end of said frame for selectively raising and lower said frame for selectively adjusting the depth of cut of said ground breaking means;
   d. leveling and sifting means suspended from said frame behind said ground breaking means for leveling and sifting the broken surface of the field, said leveling and sifting means being a generally planar, rigid, self-sustaining, perforate drag, said drag being suspended in a generally horizontal position in use; and
   e. rolling means extending across the rearward end of said frame for compacting the field, said rolling means having a substantially horizontal axis of rotation, said frame pivoting around the axis of rotation of said rolling means.

2. The device of claim 1, wherein said ground breaking means comprises a toothed scarifier and a rotatable pulverizer.

3. The device of claim 2, further comprising means for selectively raising and holding said scarifier in an upward position relative to its operative position with respect to the frame.

4. The device of claim 3, wherein said scarifier comprises means for pivotally attaching said scarifier to said frame.

5. The device of claim 2, wherein said pulverizer has socketed tines which may be individually removed.

6. The device of claim 1, further comprising a scraper pivotally attached to said frame forward of said roller, said scraper extending upwardly and rearwardly to contact said roller such that the earth scraped from the roller will fall to said drag means.

7. The device of claim 6, further comprising spring means for biasing said scraper against said roller.

8. The device of claim 1, wherein said leveling and sifting means is suspended from the frame by hanging means for independently adjusting the height of the front and rear portions of said drag means.

9. The device of claim 1 wherein said elevating means comprises a ground-engaging wheel and adjustment means for changing the height of said frame with respect to said wheel.

10. The device of claim 1, wherein said elevating means permits raising the frame to a height at which at least one implement in front of said roller is disengaged from the ground.

11. A method of leveling, smoothing, and compacting a level dirt playing field comprising a step of attaching to the rear of a powered vehicle a device having ground breaking means for breaking the surface of the field, generally horizontal, rigid, perforate leveling and sifting means for leveling the broken surface of the field, and rolling means for compacting the field, and a step of pulling said device over said field to simultaneously break the surface of the field with the ground breaking means to form furrows and clods, level the broken surface of the field and sift clods with the leveling and sifting means, and compact the field with the rolling means.

12. The method of claim 11 wherein said ground breaking means comprises a scarifier and pulverizer, and wherein said step of pulling said device over said field simultaneously cuts relatively coarse furrows in said field, forms more closely spaced furrows, and pulverizes material turned up in forming said relatively coarse furrows.

13. A device for the conditioning of earth fields comprising:
 a. a frame having a forward end including hitch means and a rearward end;
 b. ground engaging means including elevating means associated with the forward end of said frame for raising and lowering said frame;
 c. toothed scarifier means for forming furrows and clods in the field, said scarifier means being attached to said frame behind the hitch means, and means for selectively raising and holding said scarifier in an upward position relative to its operative position with respect to the frame, the depth of cut of said toothed scarifier being adjustable with the elevating means;
 d. rotatable pulverizer means for leveling furrows and breaking clods formed by said scarifier means, the height of said pulverizer means being adjustable with the elevating means, including raising the height of said pulverizer means to an inoperative position.
 e. drag means attached to said frame behind said ground breaking means for leveling the broken surface of the field; and
 f. rolling means extending across the rearward end of said frame for compacting the field, said rolling means having a substantially horizontal axis of rotation, said frame pivoting around said rolling means.

* * * * *

UNITED STATES PATENT AND TRADEMARK OFFICE
CERTIFICATE OF CORRECTION

PATENT NO. : 4,836,295

DATED : June 6, 1989

INVENTOR(S) : Rodger E. Estes

It is certified that error appears in the above-identified patent and that said Letters Patent is hereby corrected as shown below:

Column 1, line 23, "screen" should be ---screed---.

Column 1, line 29, "screen" should be ---screed---.

Column 1, line 37, "screen" should be ---screed---.

Column 1, line 42, "ties" should be ---times---.

Column 5, line 49, "8A" should be ---48A---.

Column 5, line 55, "3/4".Allen" should be ---3/4" Allen---.

Signed and Sealed this

Third Day of April, 1990

Attest:

HARRY F. MANBECK, JR.

Attesting Officer
Commissioner of Patents and Trademarks